United States Patent [19]

Kelaita, Jr. et al.

[11] Patent Number: 4,965,544
[45] Date of Patent: Oct. 23, 1990

[54] MOLDED CASE CIRCUIT BREAKER EXHAUST BARRIER

[75] Inventors: Joseph B. Kelaita, Jr., Bristol; David Arnold, Chester; James I. Smith, Avon, all of Conn.

[73] Assignee: General Electric Company, New York, N.Y.

[21] Appl. No.: 459,896

[22] Filed: Jan. 2, 1990

[51] Int. Cl.⁵ .............................................. H01H 9/02
[52] U.S. Cl. .................................. 335/202; 200/305; 174/138 F
[58] Field of Search .............................. 200/303–305; 174/138 F; 335/202

[56] References Cited

U.S. PATENT DOCUMENTS

| | | | |
|---|---|---|---|
| 4,181,836 | 1/1988 | Miracle | 200/149 B |
| 4,667,268 | 5/1987 | Mrowka | 174/138 F |
| 4,754,247 | 6/1988 | Raymont et al. | 335/202 |
| 4,757,294 | 6/1988 | Todaro et al. | 335/202 |

FOREIGN PATENT DOCUMENTS 2914507  4/1979  Fed. Rep. of Germany ... 174/138 F

Primary Examiner—Leo P. Picard
Assistant Examiner—Lincoln Donovan
Attorney, Agent, or Firm—Richard A. Menelly; Walter C. Bernkopf; Fred Jacob

[57] ABSTRACT

A combination panelboard-switchboard housing accepts plug-on connection with a plurality of modular electric switch-circuit breaker enclosures. The modular enclosure accepts circuit breakers or electric switches which can be field-installed with minor alteration to the enclosure. The modular switch enclosure further accepts a wide range of ampere ratings within a standard enclosure size. A mechanical latch arrangement on the bottom of the modular enclosure prevents the modular enclosure from being removed from the panelboard-switchboard housing. Controlled temperatures are achieved within the housing by optimized circulating air flow.

9 Claims, 4 Drawing Sheets

MOLDED CASE CIRCUIT BREAKER EXHAUST BARRIER

BACKGROUND OF THE INVENTION

When industrial-rated circuit breakers are double-branch-connected within lighting panelboard assemblies, the line ends of opposing pairs of circuit breakers are arranged close together within the panelboard enclosure. For purposes of this disclosure, "double-branch" connection is defined as that arrangement whereby a pair of circuit breakers are connected to the same phase bus bars. The line terminal lugs are omitted and the circuit breaker line straps are connected with the bus bars by means of offset branch strap connectors.

The old style circuit breakers were open at the top of the line lug compartments to facilitate the insertion of a tool to connect the circuit breaker line terminal lugs within a multi-phase power distribution circuit. With newer designs, a cap is arranged over the line terminal compartments once the terminal connections were made to prevent inadvertent contact with the bus bars or line straps per se.

When an overcurrent condition occurs, the gases originating within one of the closely aligned circuit breakers could transfer to the other circuit breaker within the double-branch arrangement, resulting in a phase-to-phase fault.

To prevent the occurrence of such phase-to phase faults within prior art panelboards, a fiberboard barrier is inserted to prevent the exhaust gases from one of the circuit breakers from entering the line lug compartments of the opposing circuit breaker. Over long periods of continuous use, the fiber material could become brittle and deteriorate. Another problem with the fiberboard barriers suggested by the prior art, is the removal of the barrier for access to the line terminals and the subsequent connection of the circuit breakers to the line terminal straps without replacing the barrier.

One purpose of this invention is to provide an effective exhaust gas barrier that allows the circuit breakers to be connected to the line straps and removed from the line straps without first having to remove the exhaust gas barrier.

SUMMARY OF THE INVENTION

An exhaust gas barrier formed as a unitary plastic assembly includes means for direct attachment to terminal straps in the absence of line terminal lugs. The barrier also includes hinged extension baffles for insertion within the line strap compartments of adjacent electric circuit breakers connected in a double-branch arrangement within electric power panelboards. The baffle extensions are easily removed when the opposing circuit breakers include similar exhaust gas barriers.

DESCRIPTION OF THE PREFERRED EMBODIMENT

Figure 1:
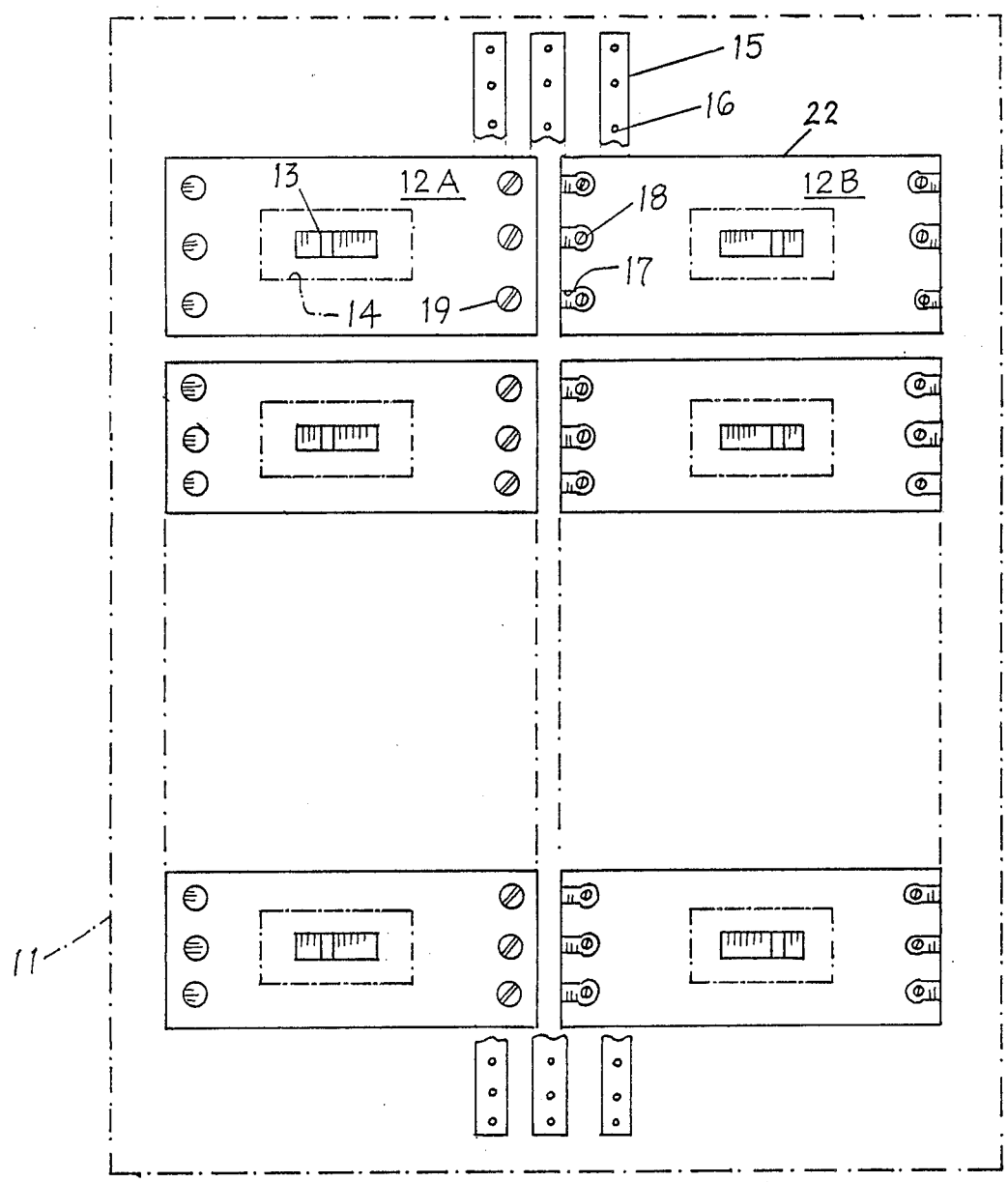
FIG. 1 is a front view of an electric power distribution panel in accordance with the prior art.

An electrical distribution power panelboard 10 is shown in FIG. 1 and is similar to that described in the aforementioned U.S. patent application Ser. No. 388,452 and differs by bolt-on attachments between the circuit breakers 12A, 12B and the bus bars 15 containing the threaded openings 16. The circuit breakers and switches described in the aforementioned U.S. patent application are plugged onto the bus bars and the bus bars are accordingly arranged in the vertical rather than in the horizontal plane shown in FIG. 1. The panelboard includes a face plate 11 with a plurality of openings 14 arranged for accessing the circuit breaker handles 13.

The circuit breaker 12A is similar to the type described in U.S. Pat. No. 4,754,247, which Patent is incorporated herein for purposes of reference and which includes a plurality of line terminal screw caps 19 placed over the line terminal access openings 17, formed within the circuit breaker cover 22, which contain the line terminal screws 18.

Figure 2:
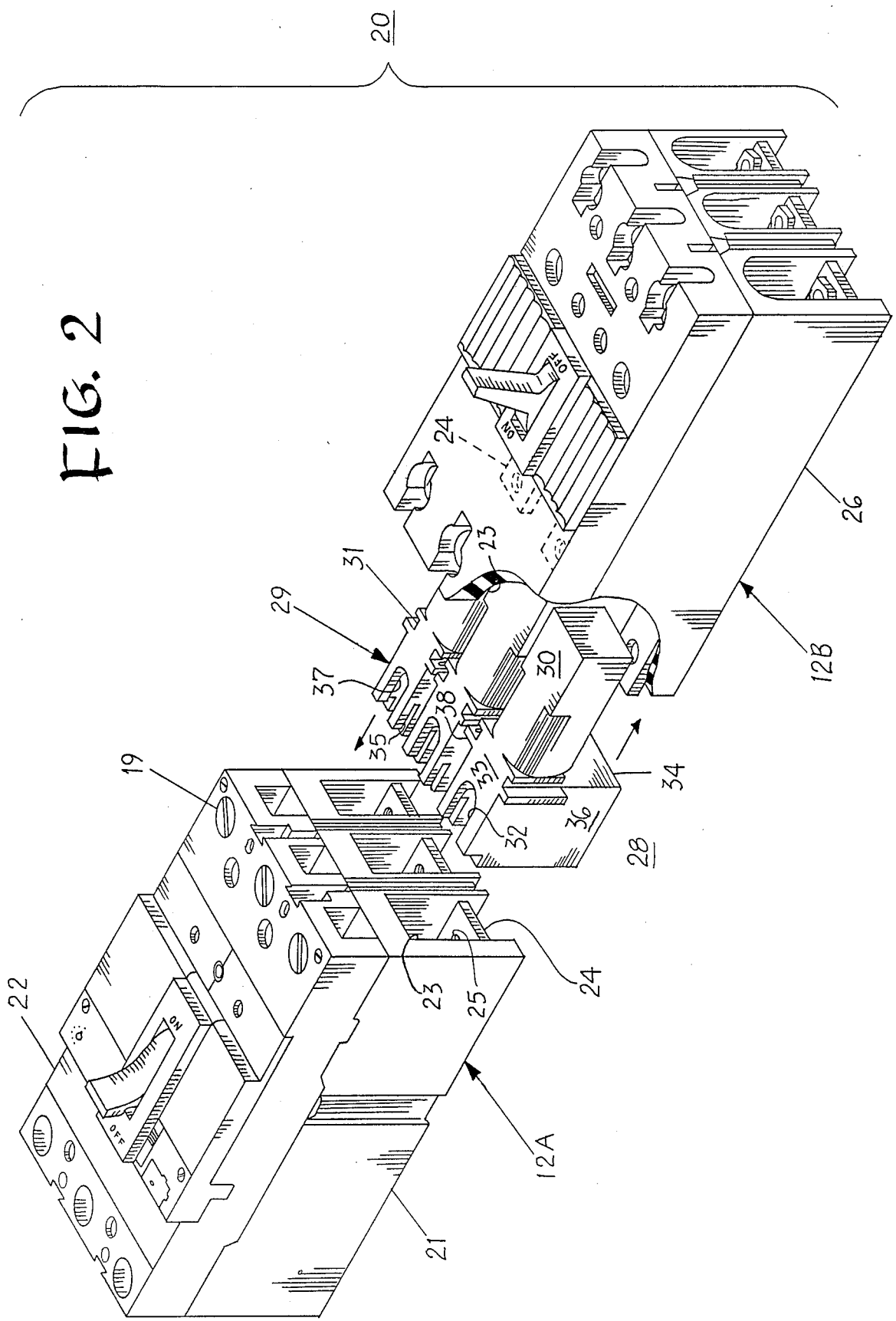
FIG. 2 is a top perspective view of the exhaust gas barrier in accordance with the invention in isometric projection to a pair of opposedly faced circuit breakers.

The circuit breakers 12B shown in FIG. 2 are similar to those described in U.S. Pat. No. 4,757,294 and do not include terminal caps 19 as shown in the cover 22 of circuit breaker 12A over the respective line and load terminal screws. In order to prevent inter-phasal faults from occurring whereby arc gases emanating from either one of a pair of branch-connected circuit breakers 20 electrically contacts the line terminal screws in the opposing circuit breaker, the exhaust barrier 28 is employed. The exhaust barrier comprises three strap covers 29 having radial slots 32, which provide access to the line straps 24 and to the threaded openings 25 formed therein, while the opposing side walls 36, 37, top cover 33 and back wall 34 respectively block the egress of any exhaust gas from the openings 23 provided in the circuit breaker case 21. This is especially helpful when the circuit breaker line lugs, such as described within the aforementioned U.S. Pat. No. 4,754,247, are omitted and the straps 24 are connected to the bus bar by means of branch straps 42, as will be discussed below with reference to FIGS. 5 and 6. Still referring to FIG. 2, the exhaust barrier further includes three box-like extensions 30 attached to the strap covers 29 by means of a flexible hinge 31, integrally formed therein. The extensions are inserted within similar openings 23 formed in the case 26 of circuit breaker 12B to electrically insulate the line straps from any ionized exhaust gases. The horizontal slots 35, formed within the side walls provides clearance for the line straps. The web connector 38 that joins the three strap covers together provides for individual flexible movement of the strap covers to compensate for the differences in the spacing of the line straps as well as the size of the openings 23.

Figure 3:
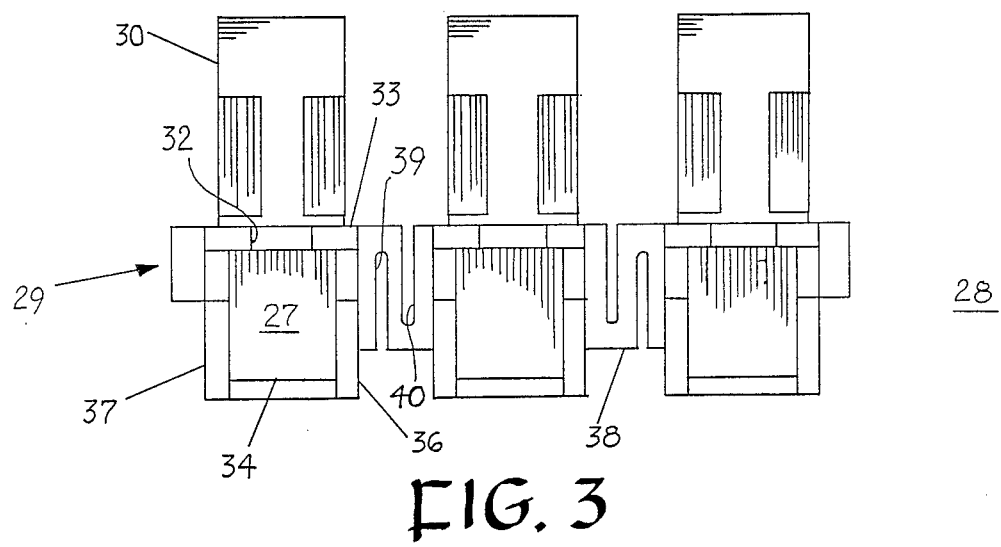
FIG. 3 is an end view of the exhaust barrier depicted in FIG. 2.
Figure 4A:
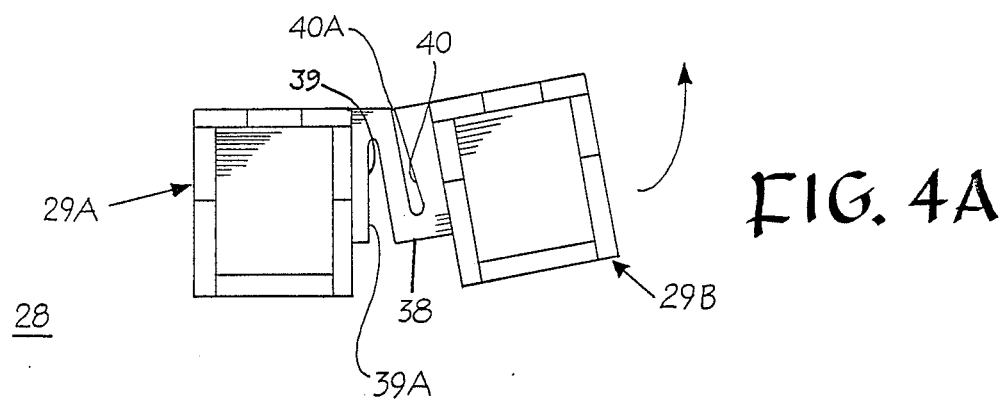
FIGS. 4A, 4B are front views of the arc gas barrier depicted in FIG. 3.
Figure 4B:
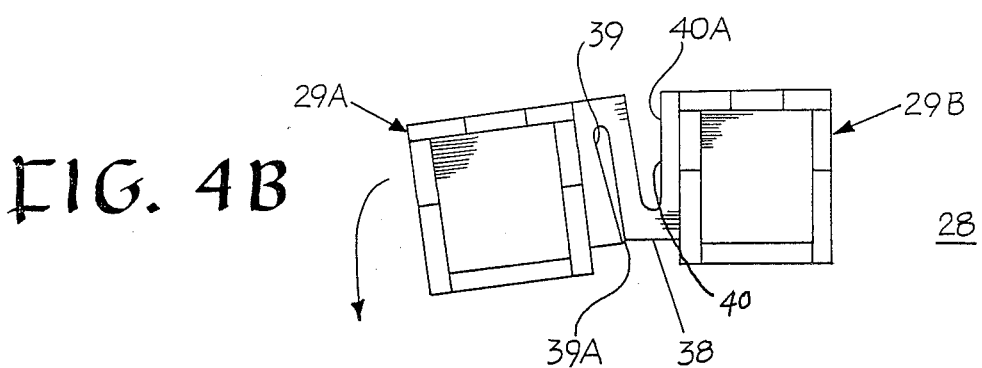

The function of the web connector 38 within the exhaust barrier 28 is best seen by referring now to FIG. 3. A line strap recess 27 integrally-formed within the strap cover 29 between the opposing side walls 36, 37 and the back wall 34. The top cover 33 closes the top portion of the recess, while the radial slot 32 provides access to the line terminal screws described earlier. The box-like extensions 30 extend from the back side of the top cover and are removable as will be discussed below in greater detail. The web connector 38 interfacing each of the individual strap covers 29 has a pair of elongated slots 39, 40 parallel to each other and running in opposite directions to provide three dimensional flexibility, as best seen by referring now to FIGS. 4A, 4B. Although three such strap covers 29 are employed for three phase applications, only two, namely 29A and 29B, are depicted herein for purposes of illustration. The two strap covers are interconnected by means of the web connector 38 that deforms to allow relative motion between the two strap covers. When the strap cover 29B in the exhaust barrier 28 is rotated in the indicated direction to accommodate a line strap that is at a slight angle to the horizontal plane, the elongated slot 39 expands at its open end 39A, while the elongated slot 40 contracts at its open end 40A, to thereby provide relative movement between the two strap covers without damaging the exhaust barrier. In FIG. 4B the strap cover 29A is rotated in the oppositely indicated direction, whereby the web connector 38 becomes deformed such that the elongated slot 39 contracts at its open end 39A while the elongated slot 40 expands at its open end 40A, allowing the adjacent strap cover 29B to remain in a fixed position.

Figure 5:
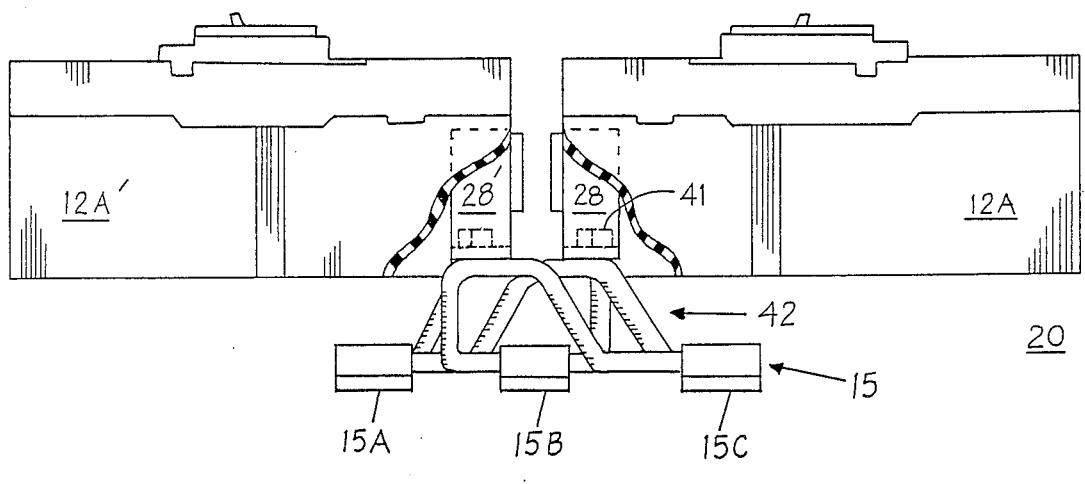
FIG. 5 is a side view of a pair of similar circuit breakers connected in a double-branch configuration.

When two similar circuit breakers 12A, 12A' are arranged in a double-branch application with bus bars 15 as depicted at 20 in FIG. 5, the box-like extensions 30 (FIG. 3) are removed from the exhaust barriers 28, 28' before insertion within the respective breakers. It is noted that the terminal screws 41 are electrically protected from any ionized exhaust gases emanating from either of the two circuit breakers. Double-branch-connection with the bus bars 15A, 15B, 15C is made by means of offset branch straps, as indicated generally at 42.

Figure 6:
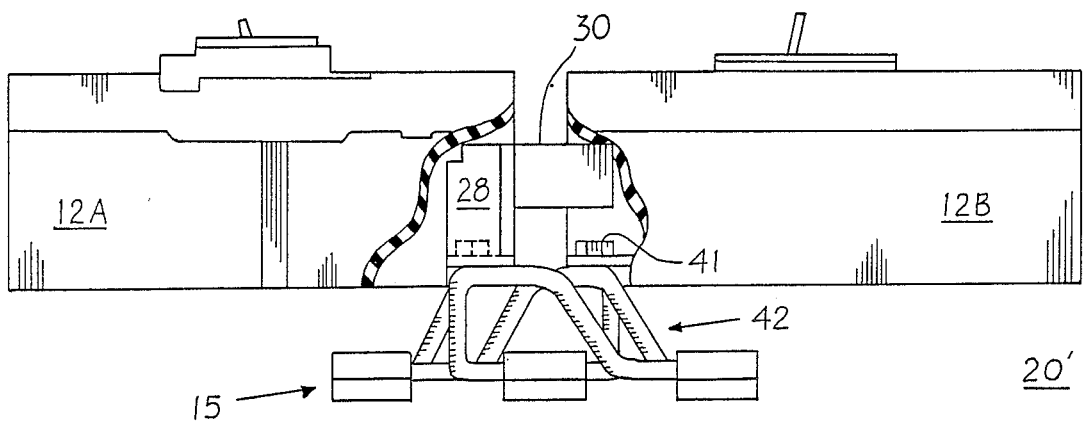
FIG. 6 is a side view of a pair of dissimilar circuit breakers connected in a double-branch configuration.

When connecting dissimilar circuit breakers 12A, 12B to form the double branch connection 20' in FIG. 6, the box-like extension 30 on the exhaust barrier 28 is inserted within the circuit breaker 12B and extends over and electrically insulates the line terminal screws 41. The line terminal screws are connected to the bus bars 15 by means of branch straps 42.

Having thus described our invention, what we claim as new and desire to secure by Letters Patent is:

1. A molded case circuit breaker line terminal exhaust gas insulation shield comprising:
    an insulative line strap cover including a pair of opposing sidewalls, a top piece and a back piece inserted within a line terminal compartment on one circuit breaker protecting a first line terminal strap within said one compartment from contact with external ionized arc gases and controllably directing internal ionized arc gases away from the panelboard phase bus bars; and
    an insulative extension hingeably attached to said top piece and inserted within a line terminal compartment within an adjoining circuit breaker to protect a second line terminal strap within said adjoining circuit breaker from said internal ionized gases originating from said one circuit breaker.

2. The insulation shield of claim 1 including a first slot through said top piece providing access to said terminal strap.

3. The insulation shield of claim 2 including a horizontal slot through one of said sidewalls to accommodate said line terminal strap.

4. The insulation shield of claim 1 wherein said extension comprises a box-like enclosure closed at a top and sides and open at a bottom.

5. The insulation shield of claim 1 wherein said extension is attached to said strap cover by means of a flexible hinge.

6. The insulation shield of claim 1 wherein said extension is removably attached to said line strap cover.

7. A molded case circuit breaker line strap shield comprising:
    a plurality of insulative line strap covers, each including a pair of opposing sidewalls, a back and a top piece defining a line strap receptacle;
    a corresponding plurality of extensions removably attached to each of said line strap covers, said extensions being inserted within line terminal openings within an adjoining circuit breaker; and
    a flexible web connecting each of said line strap covers, said web being arranged for allowing movement between said line strap covers to accommodate variations in position between line straps arranged within a circuit breaker line strap compartment.

8. The line strap shield of claim 7 wherein said flexible web includes a pair of elongated slots extending from opposing edges of said web.

9. The line strap shield of claim 7 including a radial slot through said top piece for providing access to a circuit breaker line terminal strap.

* * * * *